United States Patent [19]
Anderson et al.

[11] 3,759,297
[45] Sept. 18, 1973

[54] UTILITY LINE HOLDER

[75] Inventors: William C. Anderson; Raymond A. Bleeker, both of Grand Rapids, Mich.

[73] Assignee: Westinghouse Electric Corporation, Pittsburgh, Pa.

[22] Filed: Jan. 10, 1972

[21] Appl. No.: 216,416

[52] U.S. Cl.................. 138/156, 138/106, 248/243
[51] Int. Cl................................................ F16l 9/00
[58] Field of Search.................... 138/156, 128, 106; 150/52; 174/48, 49; 211/88, 103; 248/73, 243

[56] References Cited
UNITED STATES PATENTS
1,622,032   3/1927   Frederickson ..................... 138/156
1,055,173   3/1913   Hodkinson ......................... 138/156
1,676,486   7/1928   Frederickson ..................... 138/156
2,408,253   9/1946   Diebold ............................. 138/128

*Primary Examiner*—Samuel B. Rothberg
*Assistant Examiner*—Steven M. Pollard
*Attorney*—A. T. Stratton et al.

[57]  ABSTRACT

A utility line holder for containing and concealing interior office utility lines for office electrical equipment and the like which comprises a wall mounted, normally closed, flexibly openable elongated tubular channel for use particularly in modular space dividing office wall systems.

2 Claims, 4 Drawing Figures

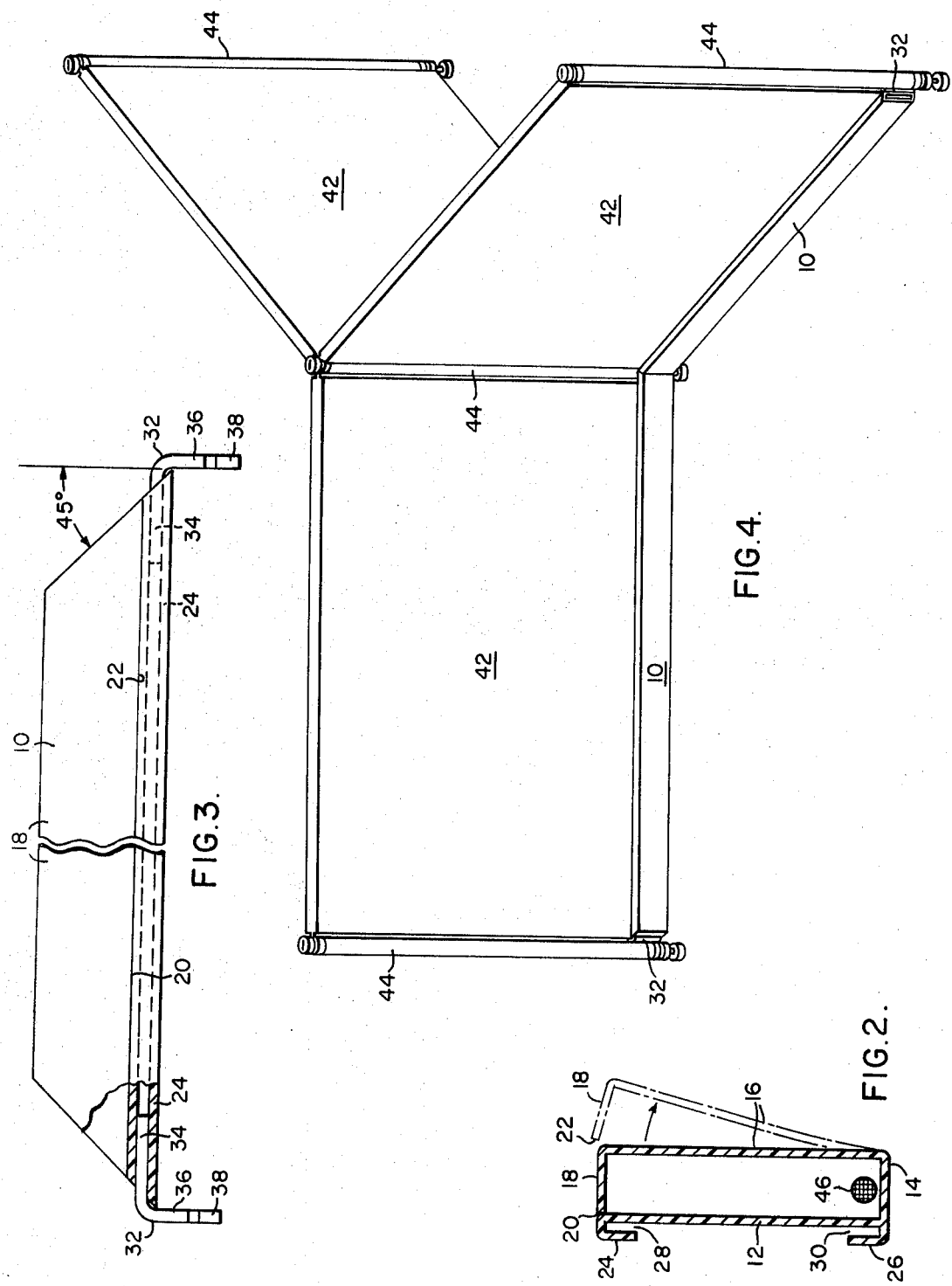

UTILITY LINE HOLDER

BACKGROUND OF THE INVENTION

Everyone who has worked in an office for even a short period of time has encountered the problems presented by telephone cords, electric typewriter cords and other electrical appliance cords running along the edges of the floor until they reach an electrical outlet. These lines not only detract from the decore of the office but additionally can be a safety hazard. Catching a foot or the leg of a chair on the cord can be both dangerous to the individual involved as well as damaging to the equipment at the other end of the cord which is very likely to be pulled from the table or stand upon which it is sitting. Although these lines present a problem for the users of the office space, they are an even greater problem to the personnel who must daily vacuum the carpets or clean the floors.

The above described problems are quite apparent to users of offices even of the fixed wall variety. The foregoing problems are magnified tenfold in a modern open area office complex. In the modern planning of interior office spaces the modern concept of so called "office landscaping" is becoming more and more prevelant. In the majority of these systems, the building is constructed with an open bay which is subsequently divided up by modular paneling into small offices by means of space dividing panels of the type disclosed in copending application Ser. No. 159,360 filed July 2, 1971 by William C. Anderson and Raymond A. Bleeker for SPACE DIVIDER SYSTEM AND CONNECTOR ASSEMBLY THEREFOR. The "office landscaping" concept generally employs space dividing panels which extend from a few inches above the floor to just above eye level to separate the open bay office area into individual office cubicles. In this type of office space, all electrical and telephone lines must be carried either under the floor or somewhere adjacent the walls. Since the walls are not permanent and in many cases do not even reach the floor, except at pedestal support points, it is necessary to find a means to carry the wires and electrical cords for telephones, typewriters and the like on the exterior surface of the wall. The prior art when faced with this problem employed elongated U-shaped channels mounted adjacent the base of the wall structure to carry the cord from its entrance out of the floor into the space to the location of the equipment to be served. These open troughs were generally metallic and became unsightly collectors of dust, paper clips and small paper scraps. In addition, the outer upstanding metallic edges generally became notorious as a means by which stockings could be snagged and pant's cuffs torn. Last, but not least, the electrical lines were still quite visible even to a cursery glance and hence the wires were no better hidden from view than if they were merely lying on the floor.

SUMMARY OF THE INVENTION

The utility line holder of this invention solves all of the foregoing problems with the prior art devices and is designed to contain and conceal utility lines while keeping the utility lines above the floor and completely hidden from view.

The foregoing is accomplished in accordance with this invention by providing a utility holder which comprises a flex openable elongated tubular member being formed with an elongated slot along the length thereof defined by adjacent surfaces on opposite sides of the slot. The elongated tubular member is at least partially resilient and this resiliency provides a bias such that the adjacent surfaces are normally biased toward each other substantially closing off the elongated slot but being flexibly separable to provide access to the interior of the elongated tubular member.

BRIEF DESCRIPTION OF THE DRAWING

Many of the attendant advantages of the present invention will become more readily apparent and better understood as the following detailed description is considered in connection with the accompanying drawings, in which:

FIG. 2 is a sectional view of the utility line holder of this invention taken along the line II—II of FIG. 1;

FIG. 3 is a top plan view of the utility line holder of this invention; and

FIG. 4 is a perspective view illustrating the use of the utility line holder of this invention in a space-dividing wall system.

DESCRIPTION OF THE PREFERRED EMBODIMENT

Figure 1:
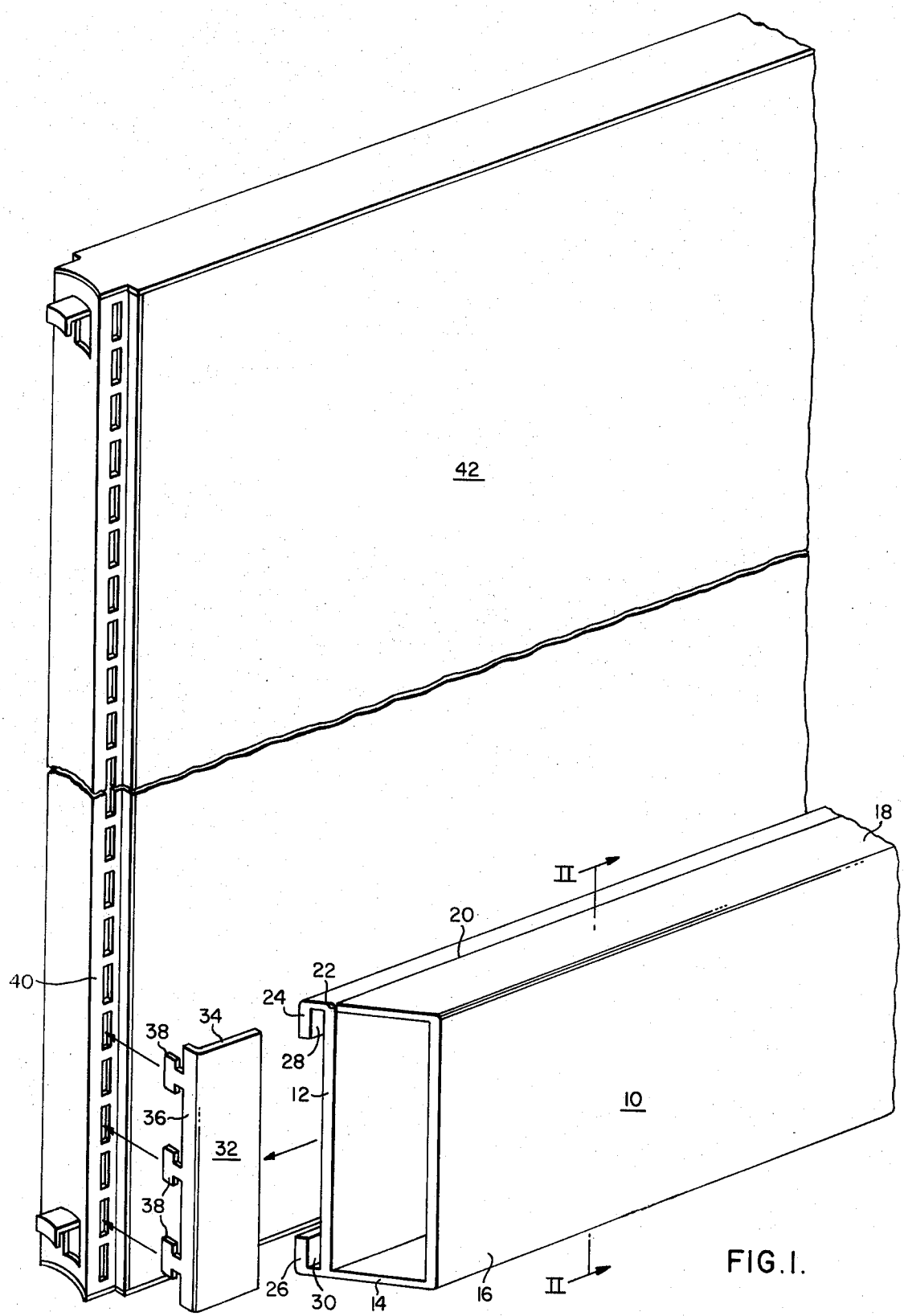
FIG. 1 is an exploded perspective view illustrating the utility line holder and mounting bracket of this invention.

Referring now in detail to the drawings wherein like reference characters represent like parts throughout the several views, there is illustrated in FIG. 1 the utility line holder of this invention, generally designated 10, in the form of a flex-openable elongated tubular member which includes a back wall 12, a base wall or bottom 14, a front wall 16, and a top wall 18. An elongated slot 20 extending for the length of the utility holder is defined by adjacent surfaces on the sides thereof which comprise the edge 22 of top wall 18 and the upper portion of the interior surface of the back wall 12. Formed integrally with the back wall 12 along the upper and lower edges thereof and extending rearwardly thereof are a pair of L-shaped flange members 24 and 26 which form upper and lower flanged slots 28 and 30. The flanged slots 28 and 30 are adapted to receive, at each end of the utility line holder 10, an L-shaped mounting bracket generally designated 32 which includes a first leg 34 which is slidably retained in the flanged slots 28 and 30 in a force-fit relationship while the other leg 36 includes a plurality of T-shaped connector elements 38 with which are adapted to cooperate with a conventional slotted standard 40 on the edge of the wall or space dividing panel 42.

As best illustrated in FIG. 3, the utility line holder in this invention is manufactured in standard lengths which are complementary to the length of the wall panels that the utility line holder is designed to be associated with. Additionally, the utility line holder 10 is preferably mitered at each end at an angle of 45° in order to accommodate corners between walls that are at angles of 90° or greater.

FIG. 4 illustrates one application of the utility line holder of this invention. In FIG. 4 there are illustrated a plurality of connector assembly and support posts 44 to which are mounted a plurality of space dividing panels 42 in the manner disclosed in copending application Ser. No. 159,360, filed July 2, 1971 by William C. Anderson and Raymond A. Bleeker for SPACE DIVIDER SYSTEM AND CONNECTOR ASSEMBLY THERE- FOR. As will be seen in FIG. 4, the utility line holder of this invention is illustrated as being mounted along the base of the wall panels 42 by mounting clips 32.

Operation of the utility line holder of this invention is best illustrated in FIG. 2 wherein a utility line 46 such as a cord to an electric typewriter, a telephone line or some other electrical wiring system is shown reclining in the bottom of the utility line holder. In order to place a utility line 46 into the utility line holder it is only necessary to apply "pull open" pressure to the top wall 18 in the direction of the arrow in FIG. 2 which will cause the side wall 16 and top wall 18 of the tubular utility line holder to move away from the back wall 12 increasing the width of the elongated slot 20 a substantial extent. Major flexure of the utility line holder will occur at the juncture of the bottom wall and front wall and in the bottom portion of the front wall. With the utility line holder opened, a utility line 46 can be simply dropped into the holder and upon release of the top wall 18, the natural bias of the resilient utility holder material will cause the top wall 18 to return to its full line position of FIG. 2 thus closing or substantially narrowing the elongated slot 20 and hence preventing materials and dust from collecting within the utility line holder.

The utility line holder of this invention can be constructed from any material which provides the necessary resiliency. However, it is preferred that the entire utility line holder be formed as a single piece vinyl extrusion which provides both the resiliency required and has the further attribute of being non-conductive. In the preferred embodiment each of the vinyl walls of the utility holder are approximately three-thirty-seconds of an inch thick and substantially uniform. Preferably also, the color of the utility holder will be identical with the color of the space dividing wall or panel 42 to which it is intended to be mounted.

It should also be apparent, that the utility holder of this invention can in addition to its obvious use with modular office dividing systems be used in conjunction with fixed wall construction where there is a requirement for extensive electrical lines that normally lie on the floor adjacent the walls.

What is claimed is:

1. A utility line holder for carrying and concealing interior office utility lines and the like which comprises:
    a single piece elongated vinyl extrusion, said single piece elongated vinyl extrusion including a back wall, a base wall, a front wall and a top wall forming a closed rectangular body with each wall continuously formed with the exception of an elongated slot separating the top wall and the back wall, said top wall being normally biased toward said back wall substantially closing said elongated slot but being flexibly separable at said slot to provide access to the interior of said rectangular body;
    upper and lower mounting flanges integrally formed with and extending rearwardly of said back wall, said upper and lower mounting flanges extending for the length of said vinyl extrusion; and
    L-shaped mounting clips releasably secured in a force fit relationship between said upper and lower mounting flanges at each end of said elongated vinyl extrusion, said L-shaped mounting clips including a plurality of T-shaped connector elements extending away from said closed rectangular body normal to said back wall.

2. A utility line holder according to claim 1 wherein the ends of said single piece elongated vinyl extrusion are mitered at an angle of approximately 45° to thereby accommodate corner mounting.

* * * * *